Oct. 20, 1931.  E. A. THOMPSON  1,827,960
TRANSMISSION
Filed April 15, 1925  2 Sheets-Sheet 1
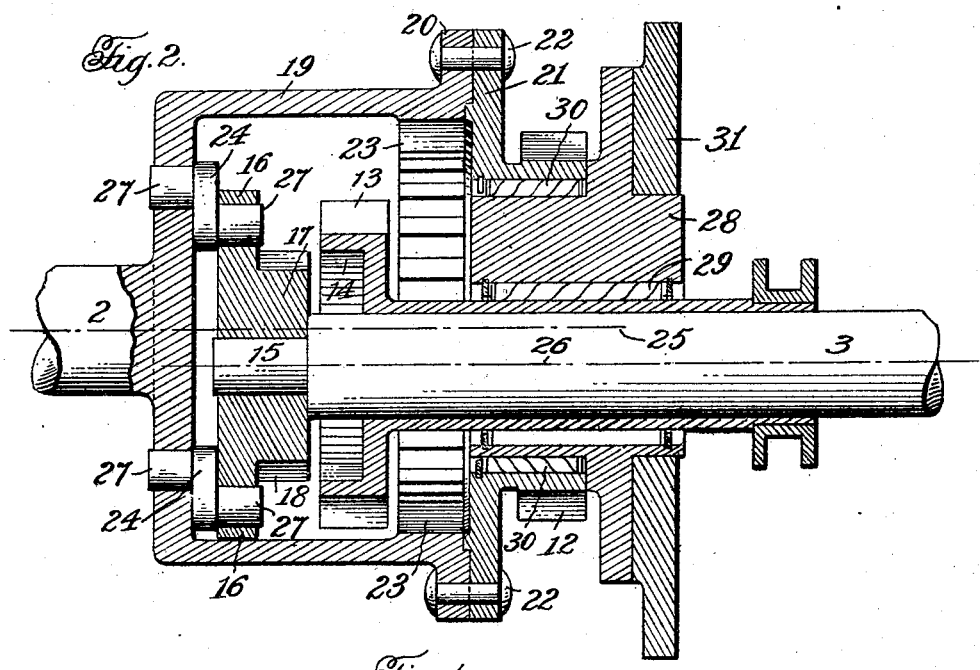
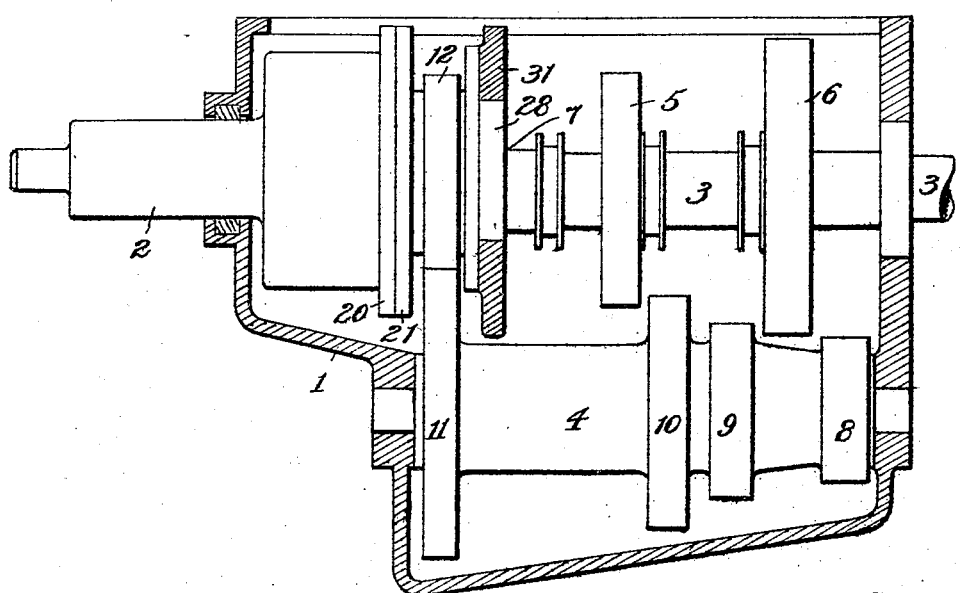
Inventor:
Earl A. Thompson,
By Milans & Milans
Attorneys
Witness:
Jas. Es. Hutchinson

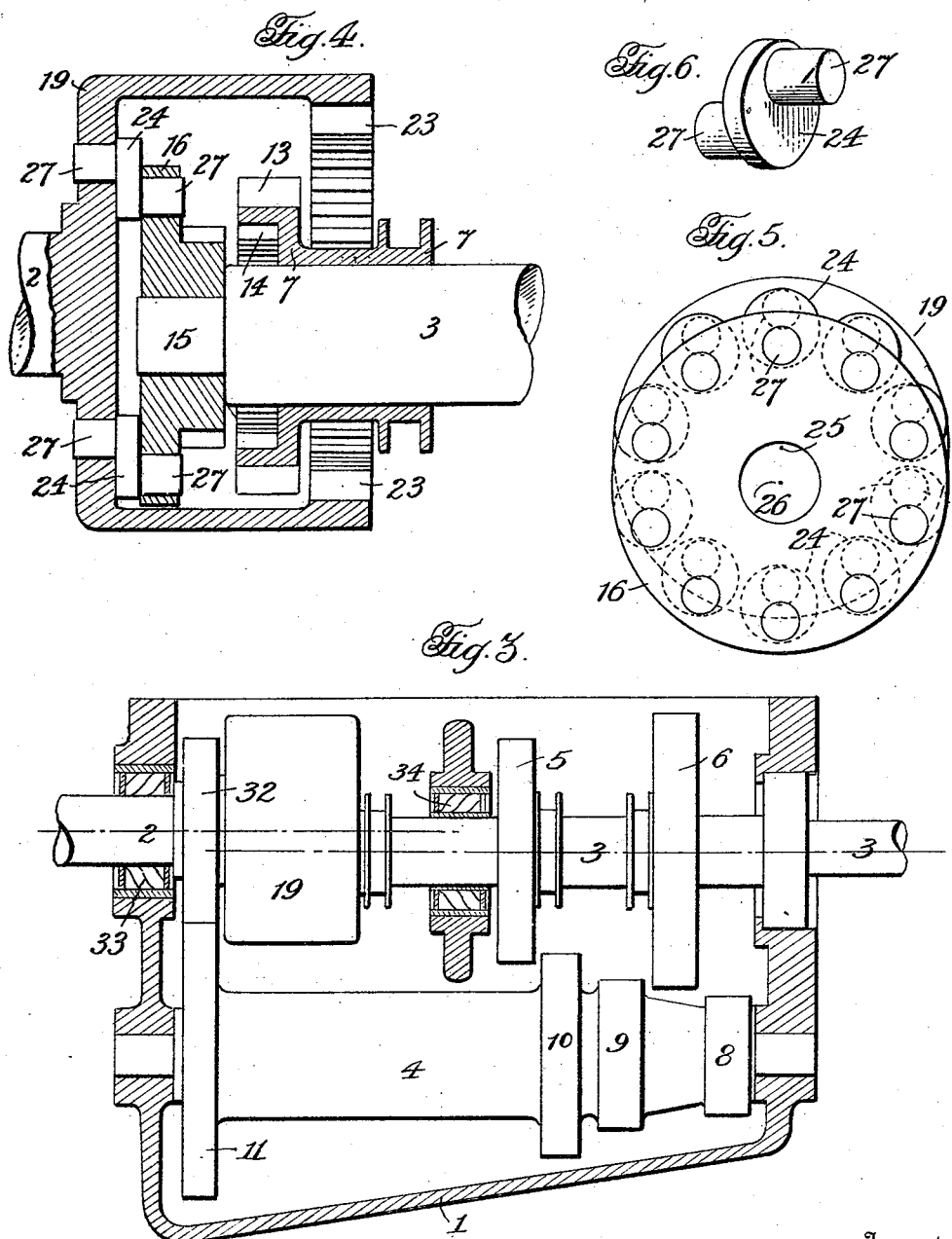

Patented Oct. 20, 1931

1,827,960

UNITED STATES PATENT OFFICE

EARL A. THOMPSON, OF PORTLAND, OREGON

TRANSMISSION

Application filed April 15, 1925. Serial No. 23,223.

My invention relates to new and useful improvements in transmissions and has for its principal object the provision of an overdrive whereby the driven shaft may be operated at a greater speed than is ordinarily the case when the driven shaft is directly connected to the drive shaft, the overdrive being adapted for use in connection with the well-known form of transmission now commonly in use.

Another object of the invention resides in the provision of a transmission in which the drive shaft and driven shaft are off center with respect to each other and providing a coupling between members carried by each of said shafts whereby said shafts may be connected for a direct drive or for a drive through a train of gears.

A further object of the invention consists in the provision of a transmission in which the drive shaft and the driven shaft are off center, one with respect to the other, and in which a freely rotatable member is carried by the driven shaft and driven at all times by the drive shaft.

A still further object of the invention consists in the provision of a transmission in which the drive shaft and the driven shaft are off center, one with respect to the other, and in which a freely rotatable member is carried by the driven shaft and driven at all times by the drive shaft, and in which there is no variation in the angular velocity between the drive shaft and said member.

As another object I provide a novel form of overdrive which is adapted to be operated from the same gear shift lever now commonly in use for shifting the gears of a standard transmission.

In the drawings I have illustrated the preferred embodiments of the invention as they now appear to me and in the following specification have described such embodiments but I do not desire to limit myself to the particular arrangements disclosed and described but such changes may be made as will fall within the scope of the appended claims.

In the drawings:

Fig. 1 is a longitudinal vertical section through the transmission housing with parts shown in elevation.

Fig. 2 is a fragmental longitudinal vertical section through my improved form of coupling and overdrive with parts shown in elevation.

Fig. 3 is a view similar to Fig. 1 of a different form of the invention.

Fig. 4 is a fragmental longitudinal vertical section of the improved form of coupling and overdrive illustrated in Fig. 3, and Fig. 5 is an enlarged diagrammatic view of the coupling.

Fig. 6 is a detail showing one of the coupling links.

The standard transmission as now commonly in use is adapted for three forward speeds, namely, "low", "intermediate" and "high", the "high" speed being secured by directly connecting the drive shaft and driven shaft. It has been found, in practice, that vibration begins to be excessive in the majority of vehicles when the speed of an engine is increased above a critical point in the majority of cars at a speed of about thirty miles an hour. To overcome this objectionable condition I have provided an improved form of overdrive in which the speed of the vehicle may be substantially increased beyond the critical point above mentioned without increasing the speed of the engine above the critical point.

In the drawings 1 indicates the transmission housing, 2 the drive shaft, 3 the driven shaft and 4 the countershaft, the driven shaft having mounted thereon the shiftable power gears 5, 6 and 7, and the countershaft having secured thereto the usual gear cluster including the gears 8, 9, 10 and 11, the gear 11 being at all times in mesh with a gear 12 carried by the drive shaft 2. The shiftable gear 7 is provided with the external teeth 13 and the internal teeth 14.

Normally freely rotatable upon the reduced extension 15 of the driven shaft is the member 16 having a reduced portion 17 provided with the teeth 18 adapted to be meshed with the internal teeth 14 of the shiftable gear 7.

The inner end of the drive shaft 2 is enlarged to form the housing 19, the outer end of which is flanged as shown at 20 and has secured thereto the member 21, by rivets or other suitable fastenings 22, upon which is formed the gear 12 previously described. The shiftable gear 13 and the member 16 are received within the housing 19 as quite clearly shown in Fig. 2 of the drawings. Teeth 23 are formed interiorly of the housing 19 and are adapted to be meshed with the exterior teeth 13 of the shiftable gear 7.

The member 16 is connected to and driven from the drive shaft 2 by means of the coupling links 24 of the shape more particularly illustrated in Fig. 6 of the drawings. These links connecting the freely rotatable member 16 to the drive member 2 rotate said member 16 at all times with the drive member.

It will be seen by an inspection of the drawings that the drive shaft 2 and driven shaft 3 are off center, one with respect to the other, and the coupling links 24 transmit a torque to the freely rotatable member 16 for securing a direct drive when the shiftable gear 7 is moved so that the internal teeth 14 are meshed with the teeth 18 and allow for an overdrive when the gear 7 is shifted so that the external teeth 13 mesh with the teeth 23.

I will now describe the operation of the coupling whereby the torque is transferred from the drive shaft 2 to the rotatable member 16 on the driven shaft 3 referring more particularly to Figs. 5 and 6. The series of holes in the end of the housing 19 driven by the drive shaft 2 and equally spaced on the same diameter of circle with respect to the center 25 of the drive shaft 2 as the holes in the rotatable member 16 are with respect to the center 26 of the driven shaft 3. It will therefore be seen that the distance between centers of the pins 27 and 27 of the link 24 is equal to the distance between the centers 25 and 26 of the two shafts and it will further be apparent that since the spacing of the holes in these members into which the pins of the connecting links are received are of equal diameter with respect to their respective centers that the distance between any two corresponding holes parallel to a line drawn through the axes 25 and 26 of the two shafts will be equal to the distance between the holes. Therefore the angular velocity of the member 16 will at all times be equal to the angular velocity of the housing 19. It will also be seen that a line joining the centers 27 and 27 of the link 24 will at all times be parallel with a line passing through the centers 25 and 26 of the shafts and that while the lines on one side of the centers are transmitting the torque by a pushing action the links on the opposite side of the center line are transmitting the torque by a pulling action.

An eccentric bushing 28 is provided in a bridge 31 formed interiorly of the transmission housing 1 and the roller bearings 29 are received interiorly in the bore of the bushing which is placed concentric with the center of the driven shaft 3. Roller bearings 30 are arranged exteriorly of the bushing for supporting the forward end of the drive shaft housing interiorly of the gear 12, the roller bushings being concentric with the center line of the drive shaft 2.

In Figs. 3 and 4 of the drawings I have illustrated a form of invention differing slightly from that form shown in Figs. 1 and 2. In the form of the invention shown in Figs. 3 and 4 the gear 32 corresponding to the gear 12 in Figs. 1 and 2 may be mounted on the drive shaft 2 at a point where the end of the drive shaft 2 is enlarged to form the housing 19. It will be understood that the gear 32 will at all times be in mesh with the gear 11. With this construction I do away with the member 21 which is secured to the end of the housing 19 as shown in Figs. 1 and 2 and in doing this I do away with the bearing which is shown in Figs. 1 and 2 as including the eccentric bushing 28 and the associated roller bearings and provide the bearing 33 mounted in one end of the transmission housing 1 and the bearing 34 mounted interiorly of said housing 1. In all other respects the form of the invention disclosed in Figs. 3 and 4, and the operation thereof, is similar to that disclosed and described in Figs. 1 and 2.

While my invention relates primarily to the provision of an overdrive for the conventional form of transmission it will be apparent that it can be used as a speed reduction gear and that the construction could also be used, with slight modifications, where merely a two speed transmission or drive is desired.

Having fully described my invention what I claim as new and desire to secure by Letters Patent is:

1. A transmission including a drive shaft and a driven shaft arranged off center one with respect to the other, a housing carried by the drive shaft, a normally freely rotatable member carried by the driven shaft, pivotal means connecting said normally freely rotatable member to the housing whereby it is driven therefrom, an internal gear formed on the inner periphery of the housing, and a shiftable member carried by the driven shaft and adapted for engagement with the normally freely rotatable member or the internal gear for securing different drive speeds.

2. A transmission including a drive shaft and a driven shaft arranged off center one with respect to the other, a normally freely rotatable member carried by one of the shafts, pivotal means connecting the normally freely rotatable member with the other shaft whereby it is driven therefrom, a shiftable gear mounted on that shaft carrying the normally freely rotatable member and adapted to be engaged with the normally freely rotatable member for establishing a relative direct connection between the drive shaft and driven shaft, and means carried by that shaft to which the normally freely rotatable member is connected adapted to be engaged with the shiftable gear for establishing a relative indirect connection between the drive shaft and the driven shaft.

3. A transmission including a drive and a driven shaft arranged off center one with respect to the other, a normally freely rotatable member carried on one of the shafts, pivotal means connecting said normally freely rotatable member with the other shaft to be driven thereby, a shiftable gear mounted on that shaft which carries the normally freely rotatable member and adapted to be engaged with the normally freely rotatable member for establishing a direct connection between the drive and driven shafts, and means carried by that shaft to which the normally freely rotatable member is connected and engageable with the shiftable gear for establishing a relatively indirect connection between the drive and driven shafts.

4. A transmission including a drive and a driven shaft arranged off center one with respect to the other, a housing carried by one of the shafts and having internal teeth, a clutch member loosely mounted on the other shaft, link members positioned between the clutch member and inner face of the housing, each of said link members including oppositely directed projections arranged off center, one of said projections being loosely received in an opening formed in the housing and the other projection being received in an opening in the clutch member, and a member slidably carried by that shaft on which the clutch member is loosely mounted, said slidable member being adapted for engagement with the clutch member to establish a relatively direct drive between the shafts or to be engaged with the internal teeth of the housing to establish a relatively indirect drive between the shafts.

In testimony whereof I hereunto affix my signature.

EARL A. THOMPSON.